United States Patent [19]

Ballerio et al.

[11] Patent Number: 4,809,930
[45] Date of Patent: Mar. 7, 1989

[54] HELICOPTER

[75] Inventors: Dante Ballerio, Caronno Varesino; Santino Pancotti, Gallarate, both of Italy

[73] Assignee: Costruziono Aeronautiche Giovanni Agusta S.p.A., Italy

[21] Appl. No.: 177,868

[22] Filed: Mar. 23, 1988

Related U.S. Application Data

[63] Continuation of Ser. No. 867,791, May 28, 1986, abandoned.

[30] Foreign Application Priority Data

May 30, 1985 [IT] Italy .............................. 53439/85[U]

[51] Int. Cl.$^4$ .............................................. B64C 27/04
[52] U.S. Cl. .............................. 244/17.11; 244/17.19
[58] Field of Search ............... 244/17.11, 17.19, 17.21, 244/119, 129.5

[56] References Cited

U.S. PATENT DOCUMENTS

| D. 146,161 | 12/1946 | Wolf | 244/17.21 |
| D. 146,798 | 5/1947 | Larsen | 244/17.21 |
| 3,131,892 | 5/1964 | Salmon | 244/129.5 |
| 3,506,219 | 4/1970 | Mouille et al. | 244/17.21 |
| 4,544,047 | 12/1970 | Gabriel | 244/17.11 |

FOREIGN PATENT DOCUMENTS 99185  1/1984  European Pat. Off. ......... 244/17.11

Primary Examiner—Galen Barefoot
Assistant Examiner—Rodney Corl
Attorney, Agent, or Firm—Kane, Dalsimer, Sullivan, Kurucz, Levy, Eisele and Richard

[57] ABSTRACT

A helicopter having a body and a tail boom connected, at the rear end, to an integral tail unit, and on which each of the vertical sections formed through the body and the tail boom presents a profile having a substantially ogival upper portion becoming gradually more pointed the closer the vertical section is to the tail unit, and a substantially flat lower portion blending, to form a substantially sharp edge, with the opposite ends of the upper portion; the connections between the upper and lower portions of the vertical sections defining two continuous edges extending from the front end of the body to the rear end of the tail boom, and intersecting a lower fin on the tail unit, the surface of which is a continuous arrow-shaped wing surface.

3 Claims, 3 Drawing Sheets

HELICOPTER

This is a continuation of application Ser. No. 867,791 filed on May 28, 1986 now abandoned.

BACKGROUND OF THE INVENTION

The present invention relates to a helicopter particularly designed for tactical transport and of the type comprising a front body fitted at the top with a main rotor and, at the rear, with an auxiliary rotor mounted on a tail unit connected integral with the rear end of a tail boom extending rearwards of the rear end of the body.

Here and in what follows, the term 'tail boom' is intended to mean a beam connecting the tail rotor and unit to the body of the helicopter, and designed to withstand flection and torque forces originating by the tail rotor and by movable surfaces of the tail unit.

In general, in modern helicopters, the tail boom is a tubular beam supporting the controls for the tail rotor and unit. In case some of these controls are arranged externally of the above tubular beam, they are covered by fairings, which are connected to, but do not form part of, the tail boom.

The construction of a tactical transport helicopter invariably involves a number of major problems, due to the conflicting requirements involved, i.e. maximum carrying capacity of the helicopter, combined with optimum streamlining for improving speed and maneuverability.

On known tactical transport helicopters, the body is usually in the form of an elongated rectangular parallelepipedon, whereas the tail boom is usually in the form of a truncated cone tapered towards the rear end, from which project two separate solids constituting an upper and a lower fin.

The aforementioned known design provides for greater carrying capacity and strength of the helicopter, but only at the expense of reduced streamlining efficiency, both during flight and, especially, when hovering. In fact, when hovering or flying at low/medium speed, the air flow generated by the main rotor clings to the outer lateral surface of the body and, especially, of the tail boom, thus resulting in detachment swirl, in turn, resulting in a relatively high fictitious load distributed along the helicopter and normally referred to as "down load" resistance. This not only reduces the carrying capacity of the helicopter, but also affects its vertical stability.

Furthermore, known helicopters of the aforementioned type also present lateral resistance and, consequently, relatively poor lateral stability, owing to the truncated-cone shape of the tail boom and the relatively small lateral fin surfaces.

SUMMARY OF THE INVENTION

The aim of the present invention is to provide a helicopter, particularly a tactical transport helicopter, designed so as to minimise down load resistance and increase lateral resistance as compared with known helicopters of the same type and size.

With this aim in view, according to the present invention, there is provided a helicopter comprising a body, a main rotor on top of the said body, a tail boom extending from the rear end of the said body, a tail unit integral with the rear end of the said tail boom and comprising an upper and a lower fin, and an auxiliary rotor on the said upper fin; characterised by the fact that the rear portion of the said body and the said tail boom present cross sections, the outer profile of each of which comprises a substantially ogival upper portion becoming gradually more pointed the closer the said section is to the said tail unit, and a substantially flat lower portion blending, to form a substantially sharp edge, with the opposite ends of the said upper portion; the connections between the said upper and lower portions of the said sections defining two continuous edges extending from the front end of the said body to the rear end of the said tail boom, so as to intersect the said lower fin on the said tail unit, the outer surface of which is a continuous arrow-shaped wing surface.

BRIEF DESCRIPTION OF THE DRAWINGS

The present invention will be described by way of example with reference to the accompanying drawings in which.

DETAILED DESCRIPTION OF THE INVENTION

Figure 1:
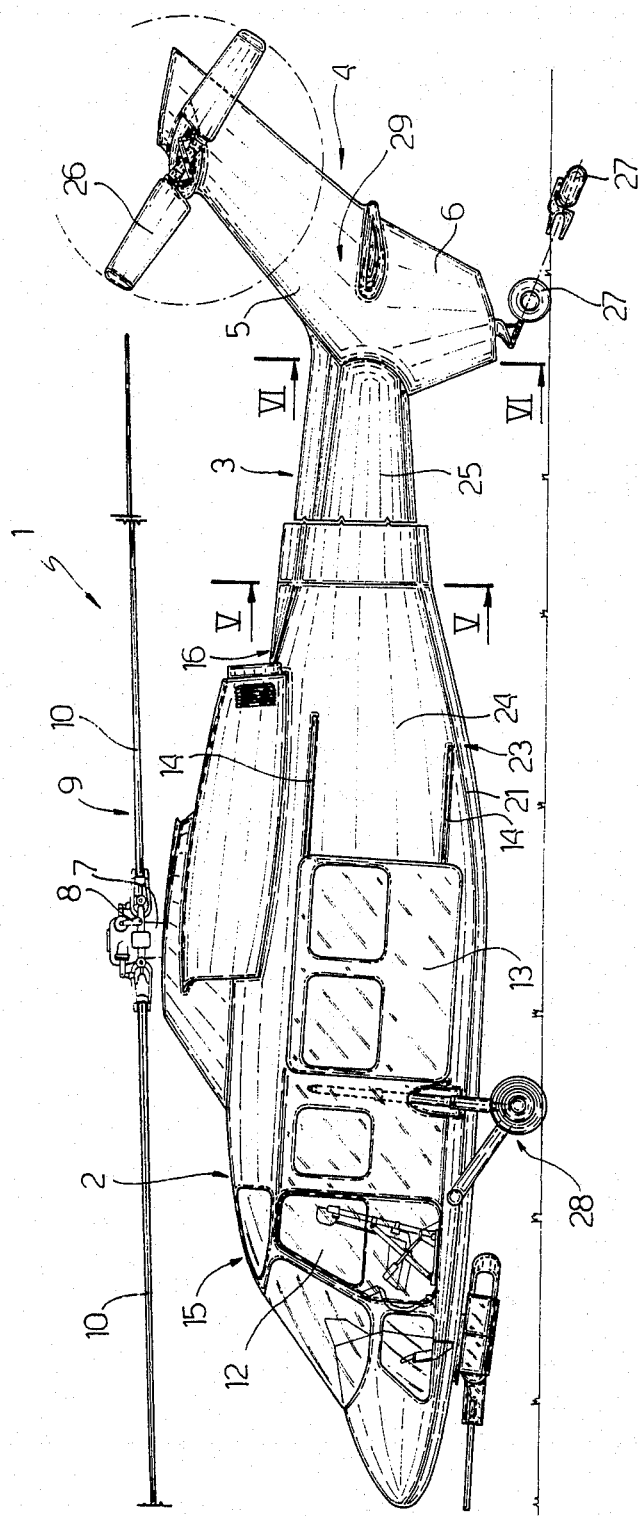
FIG. 1 shows a side view of a helicopter according to the teachings of the present invention.
Figure 2:
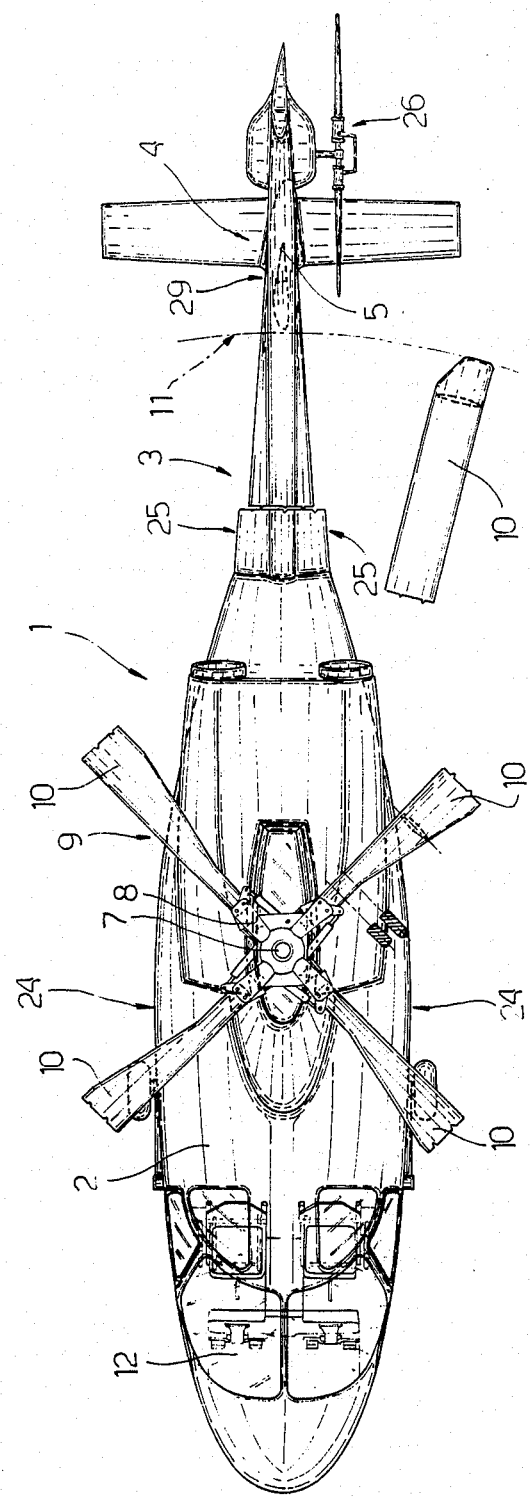
FIG. 2 shows a plan view of the FIG. 1 helicopter.
Figure 3:
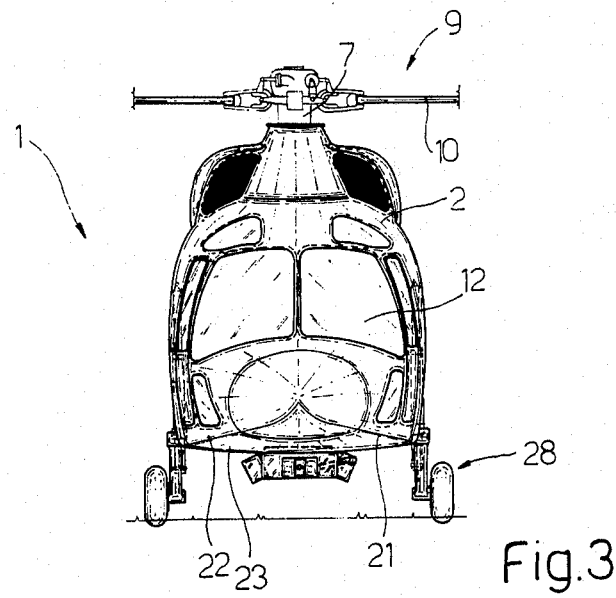
FIG. 3 shows a front view of the helicopter in FIGS. 1 and 2.

Number 1 in FIGS. 1, 2 and 3 indicates a tactical transport helicopter comprising a front body 2, from the rear end of which there extends rearwards a substantially horizontal tail boom 3, the front end of which is connected integral with body 2, and the rear end of which is fitted with an integral tail unit 4 comprising an upper fin 5 and a lower fin 6.

Through a top wall of body 2, there extends upwards a drive shaft 7 fitted on the top end with a hub 8 for a main rotor 9 comprising a number of blades 10 the operating circle 11 of which extends rearwards over tail boom 3 and just short of upper fin 5.

Body 2 comprises a front cockpit 12 and a rear loading compartment (not shown) accessible externally via two doors 13 (only one of which is shown in FIG. 1) mounted in sliding manner on horizontal rails 14.

Body 2 is substantially in the form of an elongated rectangular parallelepipedon, a front portion 15 of which is tapered frontwards, and a rear portion 16 of which is tapered rearwards and blended with the front end of tail boom 3.

Figure 4:
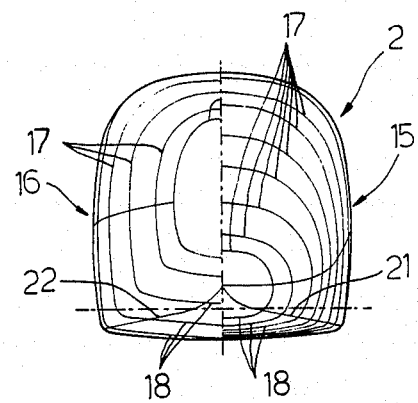
FIG. 4 shows, on one side, a schematic view of a number of successive sections on the front body portion and, on the other side, a number of successive sections on the rear body portion of the helicopter shown in the foregoing Figures.

As shown in FIG. 4, dividing body 2 at various points into planes perpendicular to the longitudinal axis of helicopter 1, there are produced, starting from the front end of body 2, sections gradually increasing in area along front portion 15 (on the right in FIG. 4) and gradually decreasing in area along rear portion 16 (on the left in FIG. 4). In more detail, each of the said sections presents an outer profile, the upper portion 17 of which is substantially ogival with a vertical axis, and the lower portion 18 of which is substantially flat and blended, to form a substantially sharp edge, with the opposite lower ends of upper portion 17.

As shown in FIG. 4, the upper portion 17 of each section in rear portion 16 of body 2 becomes increasingly pointed the closer the section is to the front end of tail boom 3.

Figure 5:
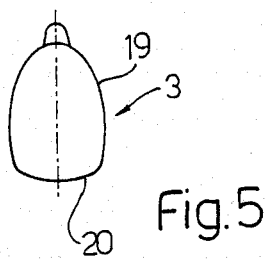
FIG. 5 shows a section along line V—V in FIG. 1.
Figure 6:
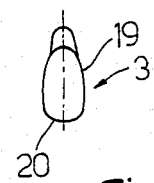
FIG. 6 shows a section along line VI—VI in FIG. 1.

As shown in FIGS. 2, 5 and 6, dividing tail boom 3 into planes perpendicular to the longitudinal axis of helicopter 1, there are produced, starting from the front end of tail boom 3, sections gradually decreasing in area towards tail unit 4. Each of the said sections presents an outer profile, the upper portion 19 of which is substantially ogival, with a vertical axis, and increasingly pointed the closer the section is to tail unit 4, and the lower portion 20 of which is substantially flat and blended, to form a substantially sharp edge, with the opposite ends of upper portion 19.

The connection points between upper portions 17 and 19 and respective lower portions 18 and 20 define two continuous edges 21 and 22 extending along the whole of body 2 and tail boom 3, so as to intersect lower fin 6, and arranged at the respective connections between the substantially flat underside 23 of helicopter 1 and walls 24 and 25 of body 2 and tail boom 3 respectively.

As shown in FIG. 2, walls 24 curve outwards and, together with doors 13 and rails 14, present a substantially constant curvature, so that, when flying with doors 13 open, the said doors 13 adhere to walls 24 with no substantial increase in the drag of helicopter 1.

The rear end of tail boom 3 blends with a thicker centre portion of tail unit 4, the upper fin 5 of which supports an auxiliary rotor 26, and the lower fin 6 of which supports a bottom wheel 27 designed to cooperate with a main undercarriage 28 projecting downwards from body 2 for enabling ground support of helicopter 1.

As shown, particularly in FIG. 1, upper and lower fins 5 and 6 constitute a continuous solid, the outer surface of which is a continuous substantially arrow-shaped wing surface 29.

From the foregoing description it will be clear that, whether hovering or flying at low/medium speed, helicopter 1 presents relatively little down load resistance. In fact, the ogival shape of the upper portion of body 2, and the presence of edges 21 and 22 extending continuously from the front end of body 2 to the rear end of tail boom 3, provide for clean detachment of the air flow produced by main rotor 9 at the lower end of the body on helicopter 1.

Furthermore, the ogival shape of the upper portion of tail boom 3, and the tapered design of the same, drastically reduces the down load resistance of the rear part of helicopter 1, thus greatly improving vertical stability of helicopter 1 when hovering.

Finally, the relatively wide, substantially flat lateral surfaces of body 2 and, especially, of tail boom 3, combined with the continuous wing surface 29 of tail unit 4, provide for greatly improving the lateral stability of helicopter 1.

We claim:

1. A helicopter comprising a body, a main rotor on top of the said body, a tail boom extending from the rear end of the said body, a tail unit integral with the rear end of the said tail boom and comprising an upper and a lower fin, and an auxiliary rotor on the said upper fin; characterized by the fact that the rear portion of the said body and the said tail boom present cross sections, the outer profile of each of which comprises a substantially ogival first portion becoming gradually more pointed the closer the said section is to the said tail unit, and a substantially flat portion lower than said first portion blending, to form a substantially sharp edge, with the opposite ends of the said first portions; the connections between the said first and lower portions of the said sections defining two continuous edges extending from the front end of the said body to the rear end of the said tail boom, so as to intersect the said lower fin on the said tail unit.

2. A helicopter as claimed in claim 1, characterised by the fact that the outer surface of the said tail unit is a continuous arrow-shaped wing surface.

3. A helicopter as claimed in claim 1, characterised by the fact that the said body presents curved side walls of substantially constant curvature; doors of the same curvature being mounted in sliding manner along and substantially contacting the said walls.

* * * * *

UNITED STATES PATENT AND TRADEMARK OFFICE
CERTIFICATE OF CORRECTION

PATENT NO.  : 4,809,930

DATED       : Marcy 7, 1989

INVENTOR(S) : Dante Ballerio and Santino Pancotti

It is certified that error appears in the above-identified patent and that said Letters Patent is hereby corrected as shown below:

Title page:

Correct assignee's name and substitute therefore

--COSTRUZIONI AERONAUTICHE GIOVANNI AGUSTA S.p.A.--

Signed and Sealed this

Thirtieth Day of April, 1991

Attest:

HARRY F. MANBECK, JR.

Attesting Officer

Commissioner of Patents and Trademarks